UNITED STATES PATENT OFFICE 2,640,754

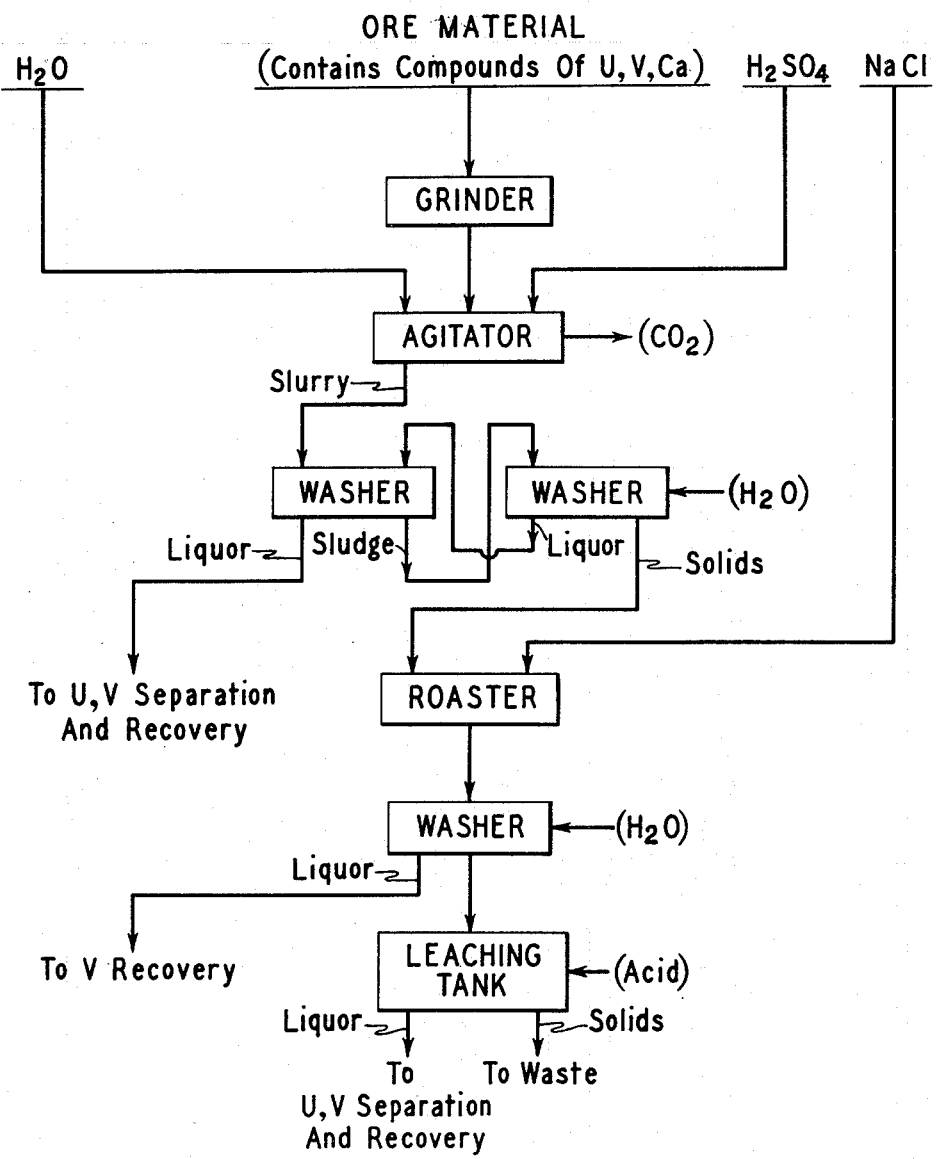

TREATMENT OF CARNOTITE ORE MATERIALS

Adolph Q. Lundquist, Grand Junction, Colo., assignor to Union Carbide and Carbon Corporation, a corporation of New York Application April 4, 1951, Serial No. 219,214

4 Claims. (Cl. 23—14.5)

This invention relates to the treatment of carnotite ore materials for the separate recovery of uranium and vanadium therefrom. More particularly, it relates to the treatment of such materials which contain relatively high proportions of oxidic calcium compounds.

A conventional treatment for carnotite ore materials involves a roasting step in which the ore is intermingled with sodium chloride. The roasting step converts vanadium compounds to water-soluble sodium vanadate and uranium compounds to insoluble sodium uranate so that separation may be achieved by washing the roasted mass with water.

The salt-roasting procedure just described can not successfully be applied to carnotite ore materials which contain relatively high proportions of calcium compounds such as calcium oxide, hydroxide or carbonate, these compounds (all generally referred to as "lime") tying up the ore values so that only a poor recovery is attained. Since certain ores, notably those of the Colorado Plateau, contain such compounds (usually calcium carbonate) in proportions exceeding 2% calculated as CaO, there is a demand for a process for treating such ores, generally called "high-lime" ores, to improve the recovery of uranium and vanadium therefrom.

It is the principal object of the invention to satisfy this demand.

The invention, by means of which this object is achieved, comprises a process for treating high-lime carnotite ore materials in which process the ore material is treated prior to roasting to convert the lime to a compound which will not interfere with the desired reactions during roasting.

The accompanying drawing is a flow sheet of the process of the invention.

Referring to the drawing, an ore material to be treated which contains compounds of uranium, vanadium and calcium is ground by conventional wet or dry grinding methods to convenient size. Generally, all of the ground ore material should pass a 14 mesh U. S. series (1.4 mm. openings) screen. The ground ore is mixed with water to form a slurry containing 20% to 60% solids, and sulfuric acid is added. The slurry is agitated in a suitable vessel for a time sufficient to convert the calcium compounds to calcium sulfate, carbon dioxide being liberated. The slurry is now treated, suitably by countercurrent decantation, to separate the liquor from the solids. The liquor contains a substantial proportion of the uranium and vanadium originally present in the ore material and may be treated in conventional manner for their separate recovery.

The solid residue contains the remainder of the uranium and vanadium compounds present in the original ore material together with calcium sulfate and gangue. It is dried, mixed with a reagent selected from the group consisting of sodium chloride, sodium sulfate, sodium carbonate and sodium nitrate, sodium chloride and sodium sulfate being preferred, and roasted in conventional manner. Since the lime of the original ore material has been converted to calcium sulfate by the prior treatment with sulfuric acid, it does not interfere with the desired reactions during roasting, and water-soluble sodium vanadate and insoluble sodium uranate are formed. The vanadate is taken into solution by washing the roast residue with water. The insoluble material is then leached with dilute acid, sulfuric or hydrochloric, to dissolve the uranium compounds and residual vanadium compounds, and the leach liquor is then treated in conventional manner for the separate recovery of uranium and vanadium compounds. The solid residue consists of calcium sulfate and gangue and may be discarded.

The quantity of sulfuric acid used in the treatment of the ore material prior to the roasting step depends in part on the quantity of lime present in the material to be treated and should be at least sufficient to combine with all of the lime to form calcium sulfate. However, no undue excess of acid should be employed, for if the acid concentration is too great the solution of uranium and vanadium will be unduly contaminated with dissolved impurities. Generally not more than about 300 pounds of concentrated acid should be used per ton of ore. On the other hand, after the sulfating reaction is complete, the pH of the slurry should not exceed 1.5 and may be as low as 0.5. A preferred pH is 1.3. If the pH is greater than about 1.5, the uranium and vanadium compounds will not go into solution readily.

If the roasting step of the method of the invention, the sands and slimes from the sulfating step are mixed with a quantity of the selected reagent slightly in excess of that required for conversion of the vanadium compounds present to water-soluble sodium vanadate. Selection of the reagent is dictated by consideration of both the quantity of soluble sodium vanadate formed and the cost of the reagent. Sodium chloride is generally preferred from both standpoints although sodium sulfate is substantially as satisfactory. The gases evolved during roasting may be treated for the recovery of hydrochloric or sulfuric acid therefrom depending on which salt is used, and the acid so recovered may be used for leaching the water-washed roast residue if desired. Roasting is conducted for about two to five hours at a temperature of about 790° C. to 840° C., the time being determined by the temperature and the temperature by the quantity of lime in the ore. The higher the lime content, the lower should be the maximum roasting temperature, and for a given ore the lower the roasting temperature, the longer the time of roasting. For example with ores containing about 2% to 5% lime (calculated as CaO) the maximum roasting temperature should not exceed 840° C. and the time at such temperature should not exceed two hours. If the lime content of the ore exceeds 5%, the maximum temperature of the roast should not exceed 820° C. and the time two hours, but roasting may be continued for five hours at a temperature of 790° C. A generally preferred temperature range is 800° C. to 825° C.

That the method of the invention provides a high recovery of vanadium and uranium compounds from high-lime ores will be evident from the following example of a typical operation conducted in accordance with its principles.

A quantity of ore containing 0.43% $U_3O_8$, 2.05% $V_2O_5$ and 5.54% CaO was ground so that all passed a 16 mesh U. S. series screen (0.2 mm. openings). The ground ore was mixed with an equal proportion of water by weight, and sulfuric acid in a proportion of 300 pounds of acid per ton of ore was added. The slurry so formed was agitated for 30 minutes and then by countercurrent decantation was separated into a liquid portion and a solid portion. The liquid portion was passed to a separation and recovery process for treatment for the separate recovery of uranium and vanadium compounds. The solid residue from the acid treatment contained 0.023% $U_3O_8$ and 1.41% $V_2O_5$; the lime originally present in the ore had been converted to $CaSO_4$.

The solid ore residue was dried and mixed with sodium chloride in the proportion of 140 pounds NaCl per ton of ore, and the mixture was roasted at about 820° C. for two hours. The roasted mass was washed with water, and the wash liquor passed to a vanadium recovery process. The water-washed residue contained 0.023% $U_3O_8$ and 0.45% $V_2O_5$. It was leached with dilute (2.5%) sulfuric acid, and the leach liquor was passed to the uranium-vanadium separation and recovery process. The acid-leached tailings contained 0.003% $U_3O_8$ and 0.14% $V_2O_5$. The extraction from the original ore was 99.3% $U_3O_8$ and 93.2% $V_2O_5$.

The process of the invention thus makes possible a remarkably high extraction of both uranium and vanadium from high-lime ores. It is applicable generally to the treatment of ore materials containing oxidic compounds of uranium and vanadium with more than 2% lime or other oxidic calcium compounds calculated as CaO.

Although specific details have been given herein by way of example, the invention is not limited to such details.

What is claimed is:

1. A method for treating ore materials containing oxidic compounds of uranium, vanadium and calcium which comprises treating such materials with dilute sulfuric acid to convert such calcium compounds to calcium sulfate and to dissolve a portion of such uranium and vanadium compounds; separating the slurry so formed into a liquid solution of uranium and vanadium compounds and a solid portion; roasting said solid portion with a reagent selected from the group consisting of sodium chloride, sodium sulfate, sodium carbonate and sodium nitrate to form a water-soluble vanadate; washing the roasted material with water to separate said vanadate from insoluble residue; leaching said insoluble residue with dilute acid to dissolve therefrom residual compounds of uranium and vanadium; and treating the solution so formed and said first-mentioned uranium compound-vanadium compound solution to recover separately uranium compounds and vanadium compounds therefrom.

2. A method for treating ore materials containing oxidic compounds of uranium, vanadium and calcium which comprises treating such materials with dilute sulfuric acid to convert such calcium compounds to calcium sulfate and to dissolve a portion of such uranium and vanadium compounds; separating the slurry so formed into a liquid solution of uranium and vanadium compounds and a solid portion; roasting said solid portion with sodium chloride to form a water-soluble vanadate; washing the roasted material with water to separate said vanadate from insoluble residue; leaching said insoluble residue with dilute acid to dissolve therefrom residual compounds of uranium and vanadium; and treating the solution so formed and said first-mentioned uranium compound-vanadium compound solution to recover separately uranium compounds and vanadium compounds therefrom.

3. A method for treating ore materials containing oxidic compounds of uranium, vanadium and calcium which comprises treating such materials with dilute sulfuric acid to convert such calcium compounds to calcium sulfate and to dissolve a portion of such uranium and vanadium compounds, forming a slurry having a pH not in excess of 1.5; separating said slurry into a liquid portion and insoluble residue; and then roasting the insoluble residue with sodium chloride in the temperature range of 790° C. to 840° C. to form a water-soluble vanadate.

4. A method for treating ore materials containing oxidic compounds of uranium, vanadium and calcium which comprises treating such materials with dilute sulfuric acid to convert such calcium compounds to calcium sulfate and to dissolve a portion of such uranium and vanadium compounds forming a slurry having a pH not in excess of 1.5; separating the slurry so formed into a liquid solution of uranium and vanadium compounds and a solid portion; roasting said solid portion with sodium chloride in the temperature range 800° C. to 825° C. to form a water-soluble vanadate; washing the roasted material with water to separate said vanadate from insoluble residue; leaching said insoluble residue with dilute acid to dissolve therefrom residual compounds of uranium and vanadium; and treating the solution so formed and said first-mentioned uranium compound-vanadium compound solution to recover separately uranium compounds and vanadium compounds therefrom.

ADOLPH Q. LUNDQUIST.

References Cited in the file of this patent

UNITED STATES PATENTS

| Number | Name | Date |
|---|---|---|
| 2,180,692 | Potter | Nov. 21, 1939 |
| 2,442,429 | Nye et al. | June 1, 1948 |